No. 710,964. Patented Oct. 14, 1902.
W. J. GALERNO.
AXLE.
(Application filed Mar. 17, 1902.)
(No Model.)
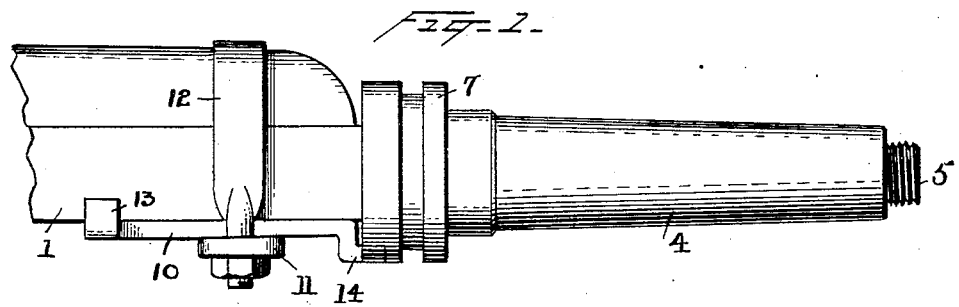
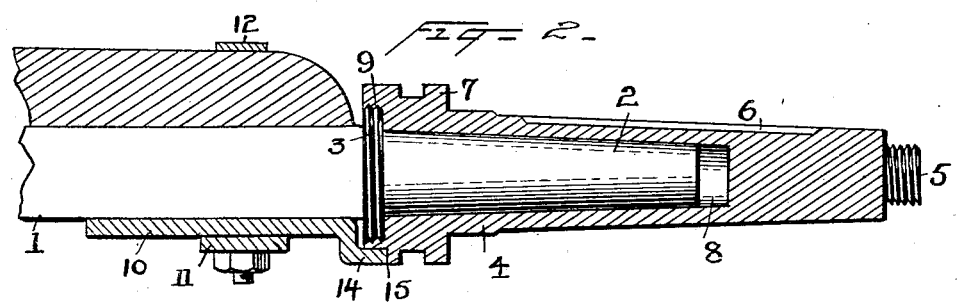
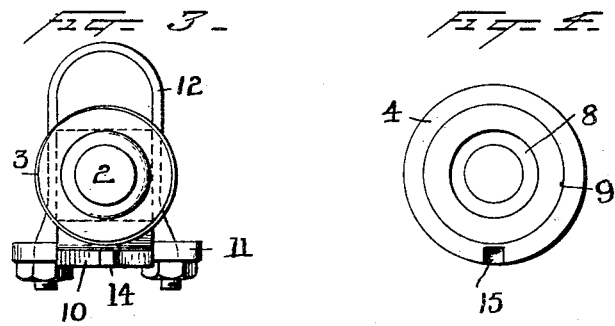
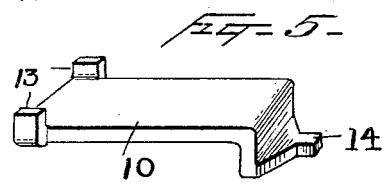
Witnesses
William J. Galerno, Inventor
by W. C. Lawson, Attorney

UNITED STATES PATENT OFFICE.

WILLIAM J. GALERNO, OF SHEPHERD, MICHIGAN.

AXLE.

SPECIFICATION forming part of Letters Patent No. 710,964, dated October 14, 1902.

Application filed March 17, 1902. Serial No. 98,697. (No model.)

*To all whom it may concern:*

Be it known that I, WILLIAM J. GALERNO, a citizen of the United States, residing at Shepherd, in the county of Isabella and State of Michigan, have invented certain new and useful Improvements in Axles, of which the following is a specification.

My invention relates to certain new and useful improvements in axles, and has for its object to produce an axle for vehicles and the like which shall have a removable sleeve to receive all wear, enabling the wearing part to be made very hard to reduce friction, while the axle proper may be very tough to withstand the stresses to which it is subjected.

A further object is to obviate the necessity for replacing the entire axle when the bearing parts are too much worn for further use by simply unscrewing the old wearing-sleeves and substituting others, an operation so simple that it may be performed by any one.

In accomplishing the above objects I form the end of the axle proper into small tapering arbors having threaded shoulders at their larger ends, and for each arbor I provide a separate sleeve, with its outer surface similar to the spindle of the axle now in general use, but provided with a tapering socket at its larger end adapted to receive with a tight fit the tapering arbor of the axle and having threads to run onto the threads of the arbor. To prevent the sleeve working loose after being placed in position, I slidably attach a detent to the axle proper, which detent is adapted to enter a notch in the end of the sleeve, and thus lock it in place.

With the above and other objects in view my invention consists in the novel details of construction and combination of parts to be clearly described in the following specification and fully set forth in the claims.

Referring to the accompanying drawings, forming a part of this specification, and in which like characters of reference indicate same parts throughout the several views, Figure 1 is a side elevation of the removable spindle-sleeve on the end of an axle. Fig. 2 is a longitudinal section thereof. Fig. 3 is an end elevation of the axle end with the sleeve removed. Fig. 4 is an end elevation of the sleeve removed from the axle, and Fig. 5 is a perspective view of the slidable detent.

In the drawings, 1 represents the axle proper, having its end tapering to form an arbor 2 in the shape of a truncated cone and an annular threaded shoulder 3 between the arbor and the squared portion of the axle proper.

4 is a separate tapering sleeve in the general shape of the common spindle, having the usual threaded lug 5 on one end, the oil-groove 6 in its top, and the abutment-flange 7 at its other end. At the larger end of the sleeve 4 is a tapering socket 8, adapted to snugly fit over the arbor 2 and being slightly deeper than the length of said arbor, as shown in Fig. 2. A threaded recess 9 at the mouth of the socket 8 engages with the threads of the shoulder 3 on the axle and draws the sleeve tightly into place.

A flat sheet-metal plate 10 is held against the under side of the squared portion of axle 1 by a bar 11, suspended from above by the ordinary arch-clip 12. At the rear end of the plate 10 are two upwardly-extending guide-lugs 13, embracing the sides of the axle 1, and at the forward end of said plate is a projecting detent-lug 14. This end of the plate 10 has a double bend to bring the lug 14 to a lower level than the main portion of plate 10, that it may clear the shoulder 3 when the plate is moved back and forth in its support. A notch 15 is formed in the edge of the sleeve 4, where it will register with the lug 14 when the sleeve 4 is in place, and when the lug is moved into said notch and the clip 12 is tightened to hold the lug in position the sleeve is locked in place against all possible turning and can only be loosened after backing the detent-lug out of the notch 15.

It will be understood that this invention is not limited to any particular form of axle-surface, as this may be varied to suit any particular form of axle-skein without affecting the operation thereof.

Having fully described my invention in detail, what I claim as new, and desire to secure by Letters Patent, is—

1. In a device of the character described, an axle, an arbor on the end thereof, a removable sleeve fitting on the arbor, and a detent on the axle engaging the sleeve.

2. In a device of the character described, an axle, an arbor on the end thereof, a sleeve fitting over the arbor, a shoulder on the axle to which the sleeve is threaded, and a detent-lug slidably secured beneath the axle and adapted to engage in a notch of the sleeve, substantially as described.

In testimony whereof I affix my signature in presence of two witnesses.

WILLIAM J. GALERNO.

Witnesses:
F. E. HIBBARD,
TRUDIE BINS.